United States Patent [19]

Clarke

[11] 4,259,927

[45] Apr. 7, 1981

[54] BIRDFEEDER

[75] Inventor: Stephen G. Clarke, Coventry, Conn.

[73] Assignee: Clark Products Co., Inc., West Hartford, Conn.

[21] Appl. No.: 48,031

[22] Filed: Jun. 13, 1979

[51] Int. Cl.$^3$ ............................................ A01K 39/01
[52] U.S. Cl. ............................................ 119/51 R
[58] Field of Search .................... 119/51 R, 52 R, 53, 119/63

[56] References Cited

U.S. PATENT DOCUMENTS

| D. 231,369 | 4/1974 | Kilham | 119/51 R X |
| 2,077,208 | 4/1937 | Brady | 119/23 |
| 2,306,312 | 12/1942 | Hyde | 119/51 R |
| 2,634,705 | 4/1953 | Mayes | 119/51 R |
| 2,683,440 | 7/1954 | Klix | 119/52 R |
| 2,699,753 | 1/1955 | Poiley | 119/52 R |
| 2,705,938 | 4/1955 | Greenough | 119/52 R |
| 2,891,508 | 6/1959 | Bower | 119/51 R |
| 3,568,641 | 3/1971 | Kilham | 119/51 R |
| 3,590,780 | 7/1971 | Dunbar | 119/51 R |
| 3,788,279 | 1/1974 | Boehland, Jr. | 119/51 R |
| 4,031,856 | 6/1977 | Chester | 119/51 R |
| 4,144,842 | 3/1979 | Schlising | 119/52 R |
| 4,188,913 | 2/1980 | Earl et al. | 119/51 R |

OTHER PUBLICATIONS

1978 Duncraft, "Wild Bird Specialists" Catalog.

Primary Examiner—Robert Peshock
Assistant Examiner—Robert P. Swiatek

[57] ABSTRACT

Birdfeeder comprising a portion for connecting the feeder to a support, said portion having an axis, a squirrel-proofing wall surrounding the axis, portions of the wall being laterally spaced from the axis sufficiently to prevent squirrels on the support from supporting themselves on the wall, the wall extending along the axis sufficiently to prevent squirrels from reaching beyond the wall, and feed dispenser supported beyond the wall.

23 Claims, 4 Drawing Figures

U.S. Patent      Apr. 7, 1981      4,259,927
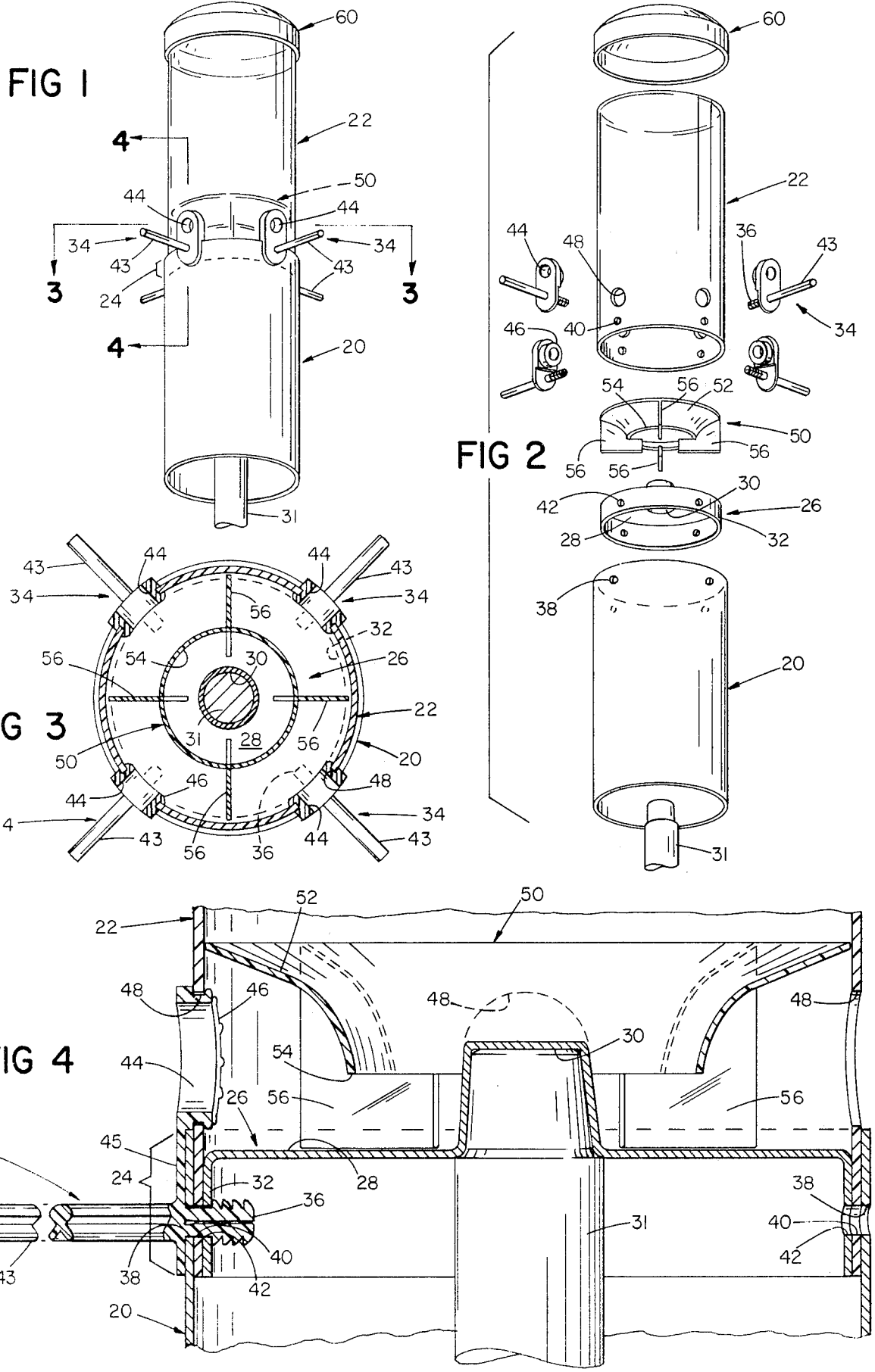

BIRDFEEDER

BACKGROUND OF THE INVENTION

This invention relates to birdfeeders.

Many efforts have been made to design a squirrel-proof feeder.

SUMMARY OF THE INVENTION

In general, the invention features a birdfeeder comprising a portion for connecting the feeder to a support, said portion having an axis, a squirrel-proofing wall surrounding the axis, portions of the wall being laterally spaced from the axis sufficiently to prevent squirrels on the support from supporting themselves on the wall, the wall extending along the axis sufficiently to prevent squirrels from reaching beyond the wall, and feed dispensing means supported beyond the wall.

In preferred embodiments the squirrel-proofing wall and a plastic reservoir wall overlap and are held together by perch extensions.

Further, in preferred embodiments, the squirrel-proofing wall is cylindrical, is over 5 inches in diameter, and is at least 10 (and most preferably 12) inches high; and a funnel-like member inside the plastic reservoir meters feed to individual ports in the reservoir wall.

The feeder is squirrel-proof, is easily and inexpensively manufactured and assembled, provides a continuous and protected supply of seed without substantial seed loss, is usable even in extremes of weather, and has a large feed capacity.

DESCRIPTION OF PREFERRED EMBODIMENTS

I turn now to the structure and operation of preferred embodiments of the invention.

FIG. 1 is a perspective view of an assembled pole-mounted birdfeeder.

FIG. 2 is an exploded version of FIG. 1.

FIG. 3 is a sectional view through 3—3 of FIG. 1.

FIG. 4 is a sectional view through 4—4 of FIG. 1.

STRUCTURE

The birdfeeder shown in FIGS. 1-4 has a green, sheet metal cylindrical squirrel-proofing wall 20, 12 inches high and 5¾ inches in diameter.

Clear acrylic plastic (Rohm & Haas "Dr-61") reservoir 22, 12.25 inches high, nests inside wall 20, with a 1.375-inch overlap 24 (FIG. 4).

Sheet metal reservoir bottom 26 has a floor 28, a central raised portion 30 for receiving a post 31, and a peripheral flange 32.

There are four perches 34 of injection-molded nylon. Each has a serrated pin-like extension 36 that fits tightly through holes 38, 40, and 42 in wall 20, reservoir 22, and flange 32, respectively, to hold these elements assembled. Each perch further has a plate portion 45 from which extends a perch 43, and a port portion 44 surrounding port 46 and snapfitted into hole 48 in reservoir 22. Perch 43 is fluted on its sides and bottom, and smooth on top.

Inside the reservoir, metering member 50 has a funnel-like wall 52 of circular horizontal cross-section with a 3-inch diameter central opening 54, and four vertical vane-like partitions 56, 90° apart. Member 50 fits tightly in the reservoir, but can slide up and down for adjustment. Partitions 56 extend from the wall of the reservoir radially inwardly to near raised portion 30.

Reservoir 22 has an open top covered by green metal cap 60.

OPERATION

Referring to FIGS. 1-4, reservoir 22 is easily filled by removing cap 60 and pouring seed into a large-diameter opening.

Member 54 funnels the seed toward the center of the reservoir, where it piles up on floor 28 around portion 30, between partitions 56. Gravity causes seed from the central piles to cover the rest of floor 28 with a relatively thin layer of seed. As birds on perches 34 reach in through ports 46 to deplete that layer, it is continually replenished from the piles, and, in turn, the piles are replenished from above. Partitions 56 prevent wind from circulating through the reservoir, and thus shield the piles and maintain their generally equal volume. As a result of all this, there is very little loss of seed through the ports, despite the gravity feed.

The overall geometry of base and reservoir make the feeder squirrel-proof. A squirrel climbing pole 31 cannot reach perches 34 because wall 20 is too wide to straddle and climb, and too high to jump. An aspect of this feature is the physiological inability of squirrels to reach out and up at the same time. The smooth outer surface of the base also helps here. Further, being of metal, it cannot be chewed.

The fluting of perches 43 helps the birds' grasp, as well as allowing fast cure during molding. The smooth tops of the perches shed snow, ice, and water. Plate portions 45 protect the birds from contacting metal, with the attendant risk of freezing in bad weather.

The interlock of the perches with the other elements facilitates manufacture, assembly, and disassembly for cleaning or storage.

The heat absorptive qualities of the green base help to rapidly melt ice and snow after a storm, freeing ports 44.

The reservoir has a very large capacity.

Cap 60 protects the seed and, being domed and smooth, cannot be grasped by squirrels.

Member 54 can be adjusted up or down for different seed sizes.

What is claimed is:

1. A birdfeeder for mounting on a post, comprising
   a portion for connecting said feeder to said post, said portion having an axis,
   a generally cylindrical, non-chewable material, squirrel-proofing wall surrounding said axis,
   portions of said wall being laterally spaced from said axis sufficiently to prevent squirrels on said post from supporting themselves on said wall,
   said wall extending along said axis sufficiently to prevent squirrels from reaching beyond said wall, and
   a transparent plastic feed reservoir extending upwardly along said axis, said reservoir having a wall extending upwardly from said squirrel-proofing wall and having a plurality of feed dispensing ports therein, said reservoir being separate from, but rigidly connected to, said squirrel-proofing wall.

2. The feeder of claim 1 wherein said lateral spacing is at least 2½ inches.

3. The feeder of claim 1 wherein said cylindrical wall has a diameter greater than 5 inches.

4. The feeder of claim 1 wherein said extent along said axis is at least 10 inches.

5. The feeder of claim 4 wherein said extent along said axis is at least 12 inches.

6. The feeder of claim 1 wherein said squirrel-proofing wall is dark-colored to absorb solar energy.

7. The feeder of claim 1 wherein said squirrel-proofing wall is smooth-surfaced for climbing resistance.

8. The feeder of claim 1 wherein said reservoir is a continuation of said squirrel-proofing wall.

9. The feeder of claim 8 wherein perches are provided adjacent said ports.

10. The feeder of claim 9 wherein each said perch includes an integral serrated perch pin which simultaneously secures said perch to said squirrel-proofing wall and to said reservoir.

11. The feeder of claim 10 wherein said squirrel-proofing wall overlaps the bottom of said reservoir in a nested arrangement, said pin passing through aligned holes in said squirrel-proofing wall and said reservoir.

12. The feeder of claim 11 wherein said squirrel-proofing wall is of metal and each said perch has an integral plastic perch plate to shield birds from contact with said metal wall.

13. The feeder of claim 12 wherein said perch is fluted for easy roosting by the birds but has a smooth top to shed snow, ice and water.

14. The feeder of claim 8 wherein said reservoir has a full-diameter opening at the top for easy filling of the reservoir with seed.

15. The feeder of claim 14 further comprising a removable cap to cover said opening.

16. The feeder of claim 15 wherein said cap is of metal.

17. The feeder of claim 15 wherein said cap is domed without projections, to prevent its being grasped by squirrels.

18. The feeder of claim 8 including a floor at the bottom of said reservoir.

19. The feeder of claim 18 wherein said floor contains a post receptor for receiving a mounting post.

20. The feeder of claim 8 wherein said reservoir includes a metering means to dispense said feed.

21. The feeder of claim 20 wherein said metering means comprises a funnel-like member adapted to continually provide seed to the central portion of said reservoir for bird consumption without substantial spillage.

22. The feeder of claim 1 wherein said squirrel-proofing wall is a cylindrical, said reservoir further includes a bottom member having a central post receptor and a peripheral flange, and a plurality of perches have pin-like extensions passing through aligned openings in said squirrel-proofing wall, reservoir, and flange to secure the same to each other.

23. The feeder of claim 1 wherein said squirrel-proofing wall is of metal.

* * * * *